US012366829B2

(12) United States Patent
Calame et al.

(10) Patent No.: US 12,366,829 B2
(45) Date of Patent: Jul. 22, 2025

(54) CLOCK CALENDAR MOBILE

(71) Applicant: ROLEX SA, Geneva (CH)

(72) Inventors: Florian Calame, Epalinges (CH); Christophe Charbon, Geneva (CH); Vincent Lemosquet, Bons-en-chablais (FR); Alexandra Quennoz, Geneva (CH)

(73) Assignee: ROLEX SA, Geneva (CH)

( * ) Notice: Subject to any disclaimer, the term of this patent is extended or adjusted under 35 U.S.C. 154(b) by 1250 days.

(21) Appl. No.: 16/211,476

(22) Filed: Dec. 6, 2018

(65) Prior Publication Data

US 2019/0179264 A1 Jun. 13, 2019

(30) Foreign Application Priority Data

Dec. 13, 2017 (EP) .................................... 17207013

(51) Int. Cl.
| | |
|---|---|
| *G04B 19/253* | (2006.01) |
| *B23K 26/38* | (2014.01) |
| *B26F 3/00* | (2006.01) |
| *G04B 13/02* | (2006.01) |
| *G04B 19/247* | (2006.01) |

(52) U.S. Cl.
CPC ....... *G04B 19/25333* (2013.01); *G04B 13/02* (2013.01); *G04B 19/247* (2013.01); *G04B 19/2538* (2013.01); *B23K 26/38* (2013.01); *B26F 3/004* (2013.01)

(58) Field of Classification Search
CPC ........................................ G04B 19/247–25393
See application file for complete search history.

(56) References Cited

U.S. PATENT DOCUMENTS

| 368,961 | A | * | 8/1887 | Morton | ................ G04B 19/247 |
|---|---|---|---|---|---|
| | | | | | 368/37 |
| 1,755,696 | A | * | 4/1930 | Kluge | ................ G04B 19/2538 |
| | | | | | 40/115 |
| 3,620,005 | A | | 11/1971 | Ganter et al. | |

(Continued)

FOREIGN PATENT DOCUMENTS

| CH | 322341 A | 6/1957 |
|---|---|---|
| CH | 704 289 A2 | 6/2012 |

(Continued)

OTHER PUBLICATIONS

Klein, Eric, English Translation of EP2631721, originally published on Aug. 28, 2013, full document, retrieved from Espacenet on Sep. 22, 2022 (Year: 2013).*
Jang, Se, English Translation of KR101422185, originally published on Jul. 23, 2014, retrieved from Espacenet on May 31, 2023, full document (Year: 2014).*

(Continued)

*Primary Examiner* — Edwin A. Leon
*Assistant Examiner* — Jason M Collins
(74) *Attorney, Agent, or Firm* — WHDA, LLP (57) ABSTRACT

A calendar mobile (10) indicating time information or information derived from the time, comprising at least one first obstacle element (1a, 2a, 3a) intended to receive a driving contact action driving the calendar mobile and/or intended to transmit a driving contact action from the calendar mobile, the first obstacle element being made of titanium or of titanium alloy, the mobile being a disk or the mobile having substantially the shape of a disk or the mobile having substantially the shape of a disk ring.

20 Claims, 4 Drawing Sheets

(56) References Cited

U.S. PATENT DOCUMENTS

| | | | | |
|---|---|---|---|---|
| 3,789,602 | A * | 2/1974 | Nemoto | G04B 19/25386 368/38 |
| 4,228,644 | A * | 10/1980 | Watanabe | G04B 19/25366 968/181 |
| 7,242,640 | B2 | 7/2007 | Fleury | |
| 8,503,267 | B2 * | 8/2013 | Philippine | G04B 19/24306 368/37 |
| 8,605,553 | B2 * | 12/2013 | Chaignat | G04B 19/247 368/220 |
| 9,045,832 | B2 | 6/2015 | Murazumi et al. | |
| 9,471,038 | B2 * | 10/2016 | Carreno | G04B 19/25306 |
| 9,841,734 | B2 * | 12/2017 | Merino | G04C 11/06 |
| 10,067,473 | B2 * | 9/2018 | Carreno | G04B 19/046 |
| 10,345,759 | B2 * | 7/2019 | Rudaz | G04B 19/25306 |
| 2005/0254350 | A1 | 11/2005 | Fleury | |
| 2007/0109916 | A1 | 5/2007 | Bron | |
| 2012/0106302 | A1 * | 5/2012 | Philippine | G04B 19/25 368/37 |
| 2012/0155228 | A1 | 6/2012 | Murazumi et al. | |
| 2017/0075307 | A1 * | 3/2017 | Merino | G04B 18/02 |
| 2020/0050152 | A1 * | 2/2020 | Caron | G04B 19/247 |

FOREIGN PATENT DOCUMENTS

| | | | |
|---|---|---|---|
| CH | 707 504 A2 | 7/2014 | |
| CN | 105785744 A | 7/2016 | |
| EP | 1 596 261 A1 | 11/2005 | |
| EP | 1 785 783 A1 | 5/2007 | |
| EP | 2 613 205 A2 | 7/2013 | |
| EP | 2631721 A1 * | 8/2013 | ........... G04B 13/022 |
| FR | 1 448 971 A1 | 3/1966 | |
| KR | 101422185 B1 * | 7/2014 | |
| WO | 2017/042456 A1 | 3/2017 | |

OTHER PUBLICATIONS

European Search Report and Written Opinion dated May 17, 2018 issued in counterpart application No. EP17207013; w/ English machine translation (27 pages).

Office Action dated Sep. 17, 2021, issued in counterpart EP Application No. 17207013.8. (5 pages).

Office Action dated May 6, 2021, issued in counterpart CN Application No. 201811525567.5 with English translation. (17 pages).

* cited by examiner

CLOCK CALENDAR MOBILE

This application claims priority of European patent application No. EP17207013.8 filed Dec. 13, 2017, the contents of which are hereby incorporated by reference herein in their entirety.

The invention concerns a mobile indicating time information or information derived from the time. The invention also concerns a clock system comprising a mobile of this kind. The invention further concerns a timepiece comprising a system of this kind or a mobile of this kind.

The invention relates in particular to a calendar mechanism, and more particularly to a calendar mobile or to a date mobile. A mobile of this kind generally takes the form of a disk provided with a toothing so as to be driven at least one step by a driving mobile delivering to it a one-off pulse at midnight, so as to display the day's date. In the case of a simple calendar mechanism, a disk of this kind is designed to be driven only one step, in a one-off manner, by a driving mobile. This disk is generally plane or substantially plane, and made from an alloy based on copper or on zinc, such as chrysocolla or nickel silver. In the case of an annual, semi-perpetual or perpetual calendar mechanism, the calendar mobile is also designed to be driven at least two steps, in a one-off manner, depending on the date. A mobile of this kind in fact has a more complex conformation. It can, for example, feature at least two distinct sets of teeth distributed or not over the same calendar disk, and can therefore have a volume and/or a section larger than those of a conventional calendar mobile.

The prior art includes annual calendar disks made from aluminum alloys chosen for their low density. Such disks are moreover coated or anodized or gilded so that their toothings have adequate hardness in order not to be marked by the driving mobile. Given the contact pressures produced between the toothings of the disk and the driving mobile or mobiles, there nevertheless exists a risk of delamination of the coating of the disk, and therefore of appearance of pollution in the movement. Moreover, the aluminum oxide resulting from the treatment of the disk risks marking, or even seriously marking, the driving mobile or mobiles and therefore risks degrading the characteristics of the driving mobile or mobiles enabling optimum operation of the calendar mechanism.

The patent CH322341 discloses a simple calendar mechanism. The latter includes a calendar disk or date disk provided with an interior toothing so as to be driven one step by a driving mobile provided with a driving finger delivering to it, every day, a one-off pulse at midnight.

For its part, the patent application EP1785783 discloses an annular calendar mechanism provided with a date disk provided with three distinct sets of teeth, staggered on three levels, two of which are designed to be driven by driving mobiles.

The patent application EP1596261 discloses a date mobile of an annual calendar including a date disk on which pivots a satellite provided with additional toothing for driving said mobile.

The object of the invention is to provide a mobile indicating time information or information derived from the time making it possible to remedy the disadvantages referred to above and to improve the known prior art devices. In particular, the invention proposes a mobile indicating time information or information derived from the time that is reliable and robust.

A mobile according to the invention is defined by point 1 below.

1. A mobile indicating time information or information derived from the time, wherein the mobile comprises at least one first obstacle element intended to receive a driving contact action driving the mobile and/or intended to transmit a driving contact action from the mobile, wherein the first obstacle element is made of titanium or of titanium alloy, wherein the mobile is a disk or the mobile has substantially the shape of a disk or the mobile has substantially the shape of a disk ring and wherein the mobile is a calendar mobile.

Different embodiments of a mobile are defined by the dependent points 2 to 11 below.

2. The mobile as defined in point 1, wherein the first obstacle element comprises or is a first set of teeth, in particular a first set of at least 7 teeth, in particular a first set of 12 teeth or of 14 teeth or of 31 teeth, and/or a first set of teeth designed to cooperate with a first driving finger every hour, or even every 24 hours.
3. The mobile as defined in any one of the preceding points, wherein the mobile comprises a second obstacle element and wherein the second obstacle element comprises or is a second set of teeth, in particular a second set of teeth comprising one tooth or four teeth or five teeth and/or a second set of teeth designed to cooperate with a second driving finger at the end of at least some months with fewer than 31 days.
4. The mobile as defined in point 3, wherein the second set of teeth is fixed relative to the rest of the mobile or the second set of teeth is movable relative to the rest of the mobile, in particular movable in rotation relative to the rest of the mobile or movable relative to the rest of the mobile so as to be retractable.
5. The mobile as defined in any one of the preceding points, wherein the mobile comprises a third obstacle element and the third obstacle element comprises or is a third set of teeth, in particular a third set of teeth designed to drive a month cam and/or indicator.
6. The mobile as defined in any one of the preceding points, wherein the mobile comprises a plurality of obstacle elements disposed on a plurality of levels or in a plurality of parallel planes relative to a rotation axis of the mobile.
7. The mobile as defined in any one of the preceding points, wherein the mobile is made in one piece.
8. The mobile as defined in the preceding point, wherein the mobile comprises a support bearing time information or information derived from the time, in particular numeric and/or alphabetic information, the support being integral with a ring.
9. The mobile as defined in any one of points 1 to 6, wherein the mobile is an assembly of components.
10. The mobile as defined in the preceding point, wherein the mobile comprises a support bearing time information or information derived from the time, in particular numeric and/or alphabetic information, the support being attached, in particular screwed, to a ring or the support being integral with the ring.
11. The mobile as defined in any one of the preceding points, wherein the mobile comprises a guide portion, in particular a mobile rotation guide portion, this portion being covered with an anti-friction material, in particular a lubricant and/or a coating like PTFE, and/or wherein the at least one of the obstacle elements is obtained by laser cutting or by waterjet cutting and/or each obstacle element is attached to the rest of the mobile or made in one piece with a component of the mobile, in particular a ring or a support.

A clock system according to the invention is defined by point 12 below.

12. A clock system, in particular a clock calendar system, comprising a mobile as defined in any one of the preceding points.

One embodiment of a clock system is defined by the dependent point 13 below.

13. The clock system as defined in the preceding point, wherein the mobile comprises a first set of teeth and the system comprises a first finger driving the first set of teeth, the first finger being made of steel, in particular of a free-cutting steel or a hardened martensitic steel and/or wherein the mobile comprises a second set of teeth and the system comprises a second finger driving the second set of teeth, the second finger being made of steel, in particular of a free-cutting steel or a hardened martensitic steel.

A clock movement according to the invention is defined by point 14 below.

14. A clock movement comprising a mobile as defined in any one of points 1 to 11 and/or a system as defined in either one of points 12 and 13.

A timepiece according to the invention is defined by point 15 below.

15. A timepiece, in particular a wristwatch, comprising a mobile as defined in any one of points 1 to 11 and/or a system as defined in either one of points 12 and 13 and/or a movement as defined in the preceding point.

The appended figures represent, by way of example, two embodiments of a timepiece according to the invention.

A first embodiment of a timepiece 300 is described hereinafter with reference to FIGS. 1 to 4. The timepiece is for example a watch, in particular a wristwatch. The timepiece comprises a clock movement 200. The clock movement is preferably a mechanical clock movement. Alternatively, the clock movement may be of electronic type.

Figure 1:
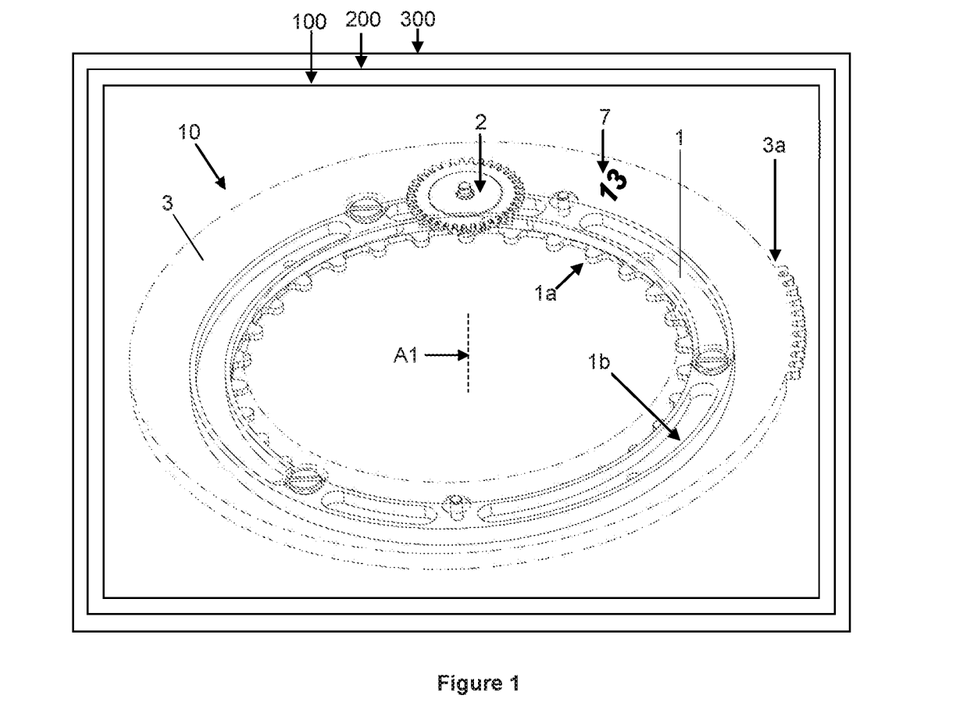
FIG. 1 is a diagrammatic view of a first embodiment of the timepiece.

The clock movement comprises a system 100 for displaying or indicating time information or information derived from the time. The clock system is for example a clock calendar, in particular a calendar displaying the date and/or the day and/or the month. The calendar may be a calendar of the single date type or of the annual date type or of the semi-perpetual date type or of the perpetual day type. The system 100 may, for example, be an annual calendar mechanism 100 such as that described in the patent application EP1596261.

The mobile 10 indicating time information or information derived from the time comprises at least one obstacle element 1a, 2a, 3a intended to receive a mobile driving contact action and/or intended to receive a mobile indexing contact action and/or intended to transmit a mobile driving contact action to another element. The mobile can therefore be driven and/or drive one or more obstacle elements. An obstacle element or at least some obstacle elements are made of titanium or titanium alloy. An obstacle element or at least some obstacle elements are for example made of "grade 2" titanium alloy or of "grade 5" titanium alloy.

In the first embodiment, the mobile 10 indicating time information or information derived from the time takes the form of a disk or the mobile has substantially the shape of a disk or the mobile has substantially the shape of a ring of a disk, that is to say an annular disk portion. The mobile 10 comprises a ring 1 and a support 3 serving here as a member for displaying the date by way of indicators or indications 7. These indicators are for example numeric or alphabetic characters.

By "ring", we mean a component of circular or annular or substantially circular or annular shape.

The mobile has a rotation axis A1. This rotation axis A1 preferably coincides with the overall axis of symmetry of the mobile.

In the first embodiment, the support 3 is mounted and positioned on the ring 1 by means of pins, and fixed to the ring 1 by means of screws. Alternatively, the support 3 could, for example, be mounted on the ring 1 by rivets or any other appropriate fixing means.

Shapes 1b, in particular openings 1b, may be provided on the ring so as to enable fine adjustment of the inertia of the mobile for a given geometry of the mobile.

Figure 2:
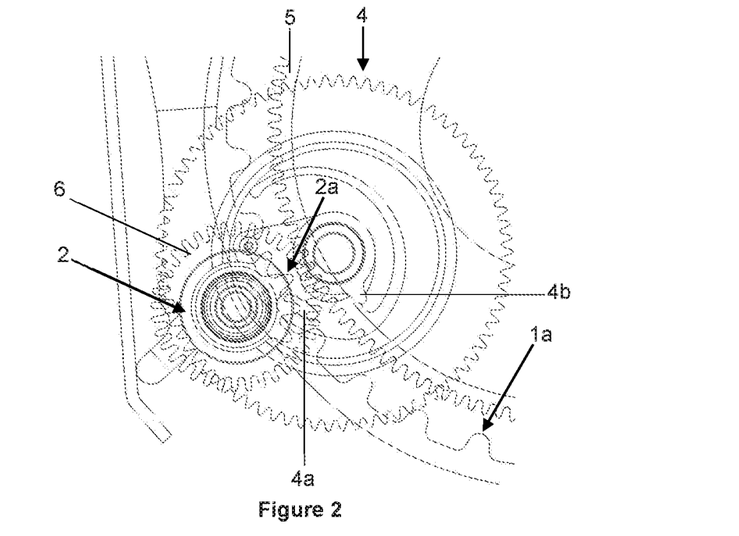
FIG. 2 is a view of a driving mechanism of a mobile indicating time information or information derived from the time of the first embodiment of the timepiece.

In this first embodiment, the ring 1 comprises a first obstacle element, that is to say the first obstacle element is formed by a portion or a part of the ring. This obstacle element may comprise or be a first set of teeth 1a, (or toothing) in particular a first set of at least 7 teeth, in particular a first set of 12 teeth or of 14 teeth or of 31 teeth and/or a first set of teeth designed to cooperate with a first driving finger 4a every hour, or even every 24 hours. In the first embodiment, the first set of teeth 1a includes 31 teeth to enable the passage of the 31 dates of a month. The first set of teeth 1a is designed to cooperate by contact with a first driving finger 4a of a driving mobile 4 as represented in FIG. 2. The first driving finger is not part of the mobile. To the contrary, the first driving finger is advantageously part of the system 100.

A set of 7 teeth or of 14 teeth is particularly indicated for a mobile indicating the day. A set of 12 teeth is particularly indicated for a mobile where the hour is not indicated by a hand. A set of 31 teeth is particularly indicated for a mobile indicating the date.

The instantaneous nature of the calendar jump or jumps can be guaranteed by energy returned by a device including, for example, a cam that is part of the mobile 4 and a spring-lever.

The first finger 4a is preferably made of steel, in particular of a free-cutting steel such as a Finemac steel or a hardened martensitic steel, like a maraging steel.

Tests carried out by the patentee show that, for the same geometry of the mobile 10 and for the same geometry of the toothing 1a, a toothing 1a made of titanium or titanium alloy has excellent resistance to ageing compared to aluminum alloy teeth.

More particularly, the toothing 1a made of titanium or titanium alloy is not perceptibly marked on ageing, and does not mark the first finger 4a. By "absence of marks", we mean that the integrity of the component is not modified, in particular the geometrical integrity of the component. Moreover, the toothing 1a made of titanium or titanium alloy shows negligible shedding of particles, or even none at all.

In particular, the toothing 1a does not deposit any perceptible pollution on the first finger 4a.

Figure 3:
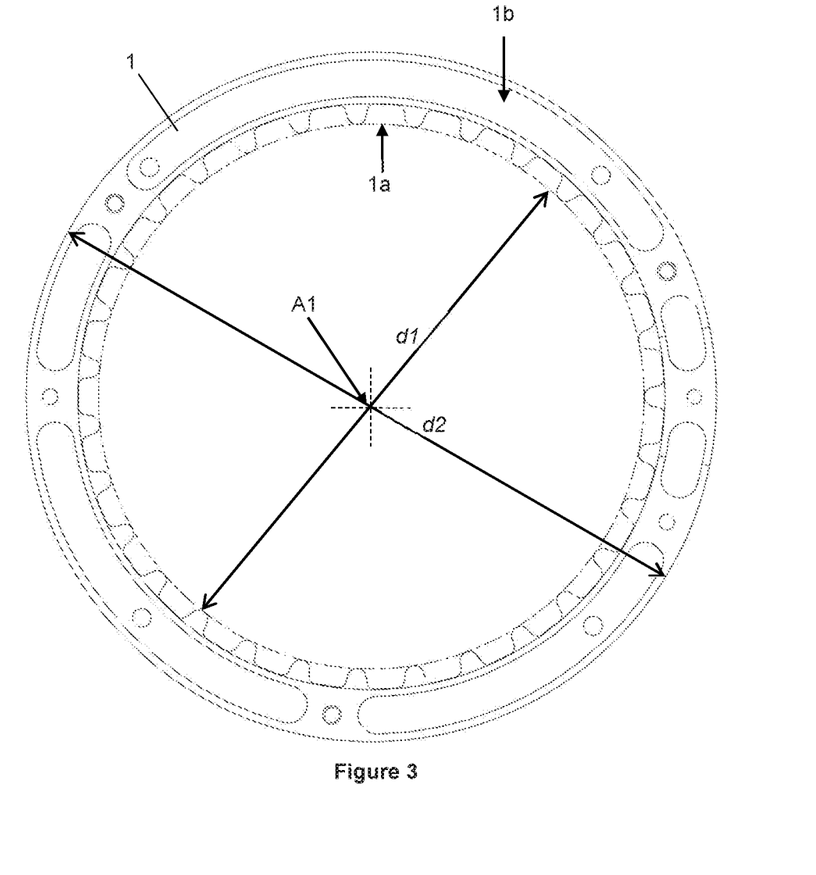
FIGS. 3 and 4 are detail views of a ring of the mobile indicating time information or information derived from the time of the first embodiment.

As represented in FIG. 3, the ring 1 preferably has an inside diameter d1, defined as the tip diameter of the toothing 1a, greater than 10 mm, or even greater than 12 mm, or even greater than 14 mm.

The ring 1 preferably has an outside diameter d2 less than 30 mm, or even less than 25 mm, or even less than 20 mm.

Figure 4:
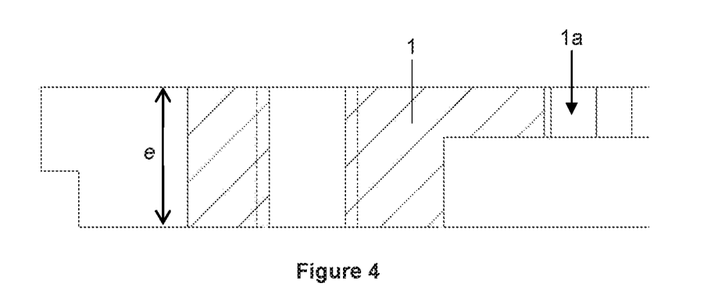

As represented in FIG. 4, the ring 1 has a maximum thickness e preferably less than 1 mm, or even less than 0.9 mm, or even less than 0.8 mm.

The ring 1 has a maximum thickness e preferably greater than 0.1 mm, or even greater than 0.15 mm, or even greater than 0.2 mm.

The ring 1 preferably has a volume v less than 45 mm$^3$, or even less than 40 mm$^3$, or even less than 35 mm$^3$.

The ring 1 preferably has a volume v greater than 20 mm$^3$, or even greater than 30 mm$^3$.

In the first embodiment represented, the toothing 1a is an internal toothing. The tips of the teeth of the toothing 1a are disposed on the inside diameter d1 of the ring 1, and the tips of the teeth of the toothing 1a are in particular oriented in the direction of the axis A1. Alternatively, the toothing 1a may be an external toothing.

The mobile 10 further comprises a second obstacle element. This obstacle element comprises or is a second set of teeth 2a (or second toothing), in particular a second set comprising one tooth or four teeth (if the month of February is not taken into consideration in programming the calendar) or five teeth (in particular if the month of February is taken into consideration in programming the calendar). The second set of teeth is preferably designed to cooperate, in particular by contact, with a second driving finger 4b at the end of at least some months of fewer than 31 days. The second set of teeth 2a may include five teeth, those five teeth corresponding to the number of months in the year with fewer than 31 days. In the first embodiment, the second toothing 2a comprises four teeth as represented in FIG. 2.

The mobile 10 comprises for example, as the second obstacle element, a second set of teeth 2a of a satellite mobile 2, the second set of teeth being formed on a portion or on a part of the satellite mobile, in particular on a portion or on a part of a component that is part of the satellite mobile. The satellite mobile advantageously pivots on the ring 1 and/or on the support 3.

In the first embodiment, the second toothing 2a is movable, in particular movable in rotation, relative to the mobile 10, and in particular movable, in particular movable in rotation, relative to the ring 1. In the first embodiment, the second toothing 2a is disposed so as to be driven in rotation by a wheel 5 fixed relative to the frame of the calendar and engaged with a gear 6 of the satellite mobile 2.

The second driving finger is not part of the mobile. To the contrary, the second driving finger is advantageously part of the system 100.

Alternatively, the second toothing 2a can take the form of a retractable set of teeth, in particular a retractable tooth, the position of which can be controlled by a control cam. By "retractable" set of teeth, we mean toothing mobile relative to the mobile, and in particular relative to the ring, in particular toothing mobile in rotation and/or in translation over a given distance and/or angular range. The second toothing can, for example, take the form of a lever that is mobile, in particular pivoted on the ring 1, a nose of which constitutes a tooth. At the end of a month with fewer than 31 days, the toothing, in particular the tooth, could be actuated by the second driving finger of the driving mobile. It is therefore possible to drive two steps of the date mobile at the end of a month of 30 days to cause a passage from day "30" to day "1".

Alternatively, the second toothing may be fixed relative to the mobile. The toothing may in particular take the form of a single tooth. In this situation, the second toothing can be made in one piece with the ring or integral with the ring. In this instance, the ring comprises the first and second obstacle elements, the first and second obstacle elements being each formed by a portion or a part of the ring. The ring can advantageously be made in one piece from titanium or titanium alloy, in particular "grade 2" titanium alloy or "grade 5" titanium alloy.

At the end of a month with fewer than 31 days, the second toothing can be actuated by a driving finger or an additional mobile, the position of which relative to the frame of the calendar is controlled by way of a connected cam. In the manner of the other fingers referred to above, this driving finger is preferably made of steel, in particular of a free-cutting steel such as a Finemac steel or a hardened martensitic steel such as a maraging steel.

Like the toothing 1a, the toothing 2a can take the form of an external toothing or an internal toothing.

Like the toothing 1a, the toothing 2a can be made of titanium or of titanium alloy. Like the first finger 4a, the second finger 4b is preferably made of steel, in particular of a free-cutting steel such as a Finemac steel or a hardened martensitic steel such as a maraging steel.

Accordingly, depending on the variant, the second toothing is fixed relative to the rest of the mobile or the second toothing is movable relative to the rest of the mobile, in particular movable in rotation relative to the rest of the mobile or movable relative to the rest of the mobile so as to be retractable.

In the first embodiment, the mobile further comprises a third obstacle element. This obstacle element comprises a third toothing 3a, in particular a third toothing designed to drive a month cam and/or indicator.

The third toothing 3a is for example disposed on the support 3. The toothing 3a is preferably made in one piece with the support 3. The third obstacle element is for example formed by a portion or a part of the support. The support 3 may equally be made in one piece from titanium or titanium alloy, in particular "grade 2" titanium alloy or "grade 5" titanium alloy.

Alternatively, the third toothing may be disposed on the ring. In this instance, the ring comprises the first, second and third obstacle elements. Each of the first, second and third obstacle elements is then formed by a portion or a part of the ring. In this instance, the toothing 3a can be made in one piece with the ring. The ring can then be made in one piece from titanium or titanium alloy, in particular "grade 2" titanium alloy or "grade 5" titanium alloy.

The third toothing is advantageously arranged such that at the end of a given month or in a given month it can actuate a month indicator and/or a month cam. Like the first and second toothings 1a and 2a, the third toothing 3a can take the form of an external toothing or an internal toothing.

Figure 6:
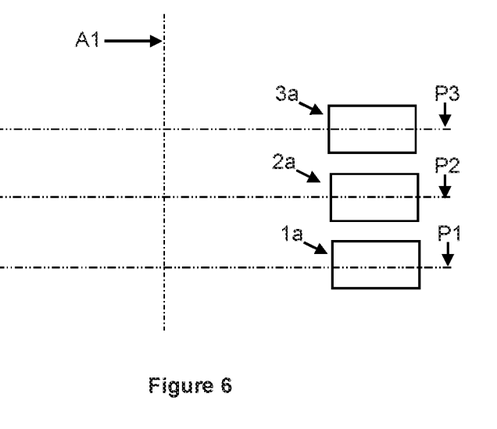
FIG. 6 is a diagrammatic view illustrating the staggering of various sets of toothings of a mobile indicating time information or information derived from the time according to either of the first and second embodiments.

As seen above, each obstacle element can comprise a respective toothing 1a, 2a, 3a. These obstacle elements can be disposed on a plurality of levels, that is to say in a plurality of parallel planes P1, P2, P3 perpendicular to the rotation axis A1 of the mobile. In particular, the first obstacle element can intersect the plane P1 without intersecting the planes P2 and P3. The second obstacle element can intersect the plane P2 without intersecting the planes P1 and P3. The third obstacle element can intersect the plane P3 without intersecting the planes P1 and P2. Alternatively, two obstacle elements can be found on the same level and/or intersect the same plane. In this instance, a first obstacle element can in particular take the form of an internal toothing while a second obstacle element can in particular take the form of an external toothing.

The mobile 10 preferably has at least two distinct levels for the first and second obstacle elements 1a, 2a to co-exist, in particular the first and second toothings 1a, 2a. In the first embodiment, the toothings 1a, 2a, 3a are distributed over three distinct levels. In the case of a ring 1 supporting at least the toothings 1a, 2a, the ring preferably has at least two distinct levels on which the first and second toothings are distributed.

The mobile 10 can be at least partially lubricated and/or at least partially coated so as to implement at least the functions of guiding the toothing 2a, in particular the functions of pivoting the toothing 2a. In particular, the ring 1 can be at last partially lubricated or at least partially coated so as to implement at least the functions of guiding the obstacle element 2a, in particular the functions of pivoting the obstacle element 2a. The mobile 10 can be at least partially lubricated and/or at least partially coated so as to implement at least the functions of guiding the mobile 10, in particular the functions of pivoting the ring 1. In particular, the ring 1 can be at least partially lubricated or at least partially coated so as to implement at least the functions of guiding the mobile 10, in particular the functions of pivoting the ring 1. A coating of this kind can, for example, include PTFE. Thus the mobile comprises a guiding portion, in particular a portion guiding the mobile in rotation, this portion being coated with an anti-friction material, in particular a lubricant and/or a coating like PTFE.

The components that are part of the mobile 10 can be manufactured by machining, in particular by free cutting. Alternatively, a component of the mobile 10, in particular a ring 1, made of titanium, in particular of "grade 2" titanium alloy or of "grade 5" titanium alloy, can be manufactured by laser and/or waterjet cutting. A manufacturing process of this kind enables a surface roughness of the teeth 1a to be obtained that is perfectly suited to the gearing function.

In the case of a calendar date mobile or a day display mobile, the contact between the first finger 4a and the first toothing 1a occurs every 24 hours in conventional operation of the calendar mechanism. Thus the tribological requirements of a mobile of this kind do not require coating of the functional portions made of titanium or titanium alloy.

Of course, a mobile 10 of this kind may be employed for any mechanism for displaying the time or an indication derived from the time. For example, a mobile of this kind may be used in a mechanism that does not indicate the hour by means of a hand, so as to display the hours. In this instance, the contact of a driving device with the mobile is again one-off and occurs only every hour. Thus the tribological requirements of a mobile of this kind do not require a coating on the functional parts made of titanium or of titanium alloy.

Figure 5:
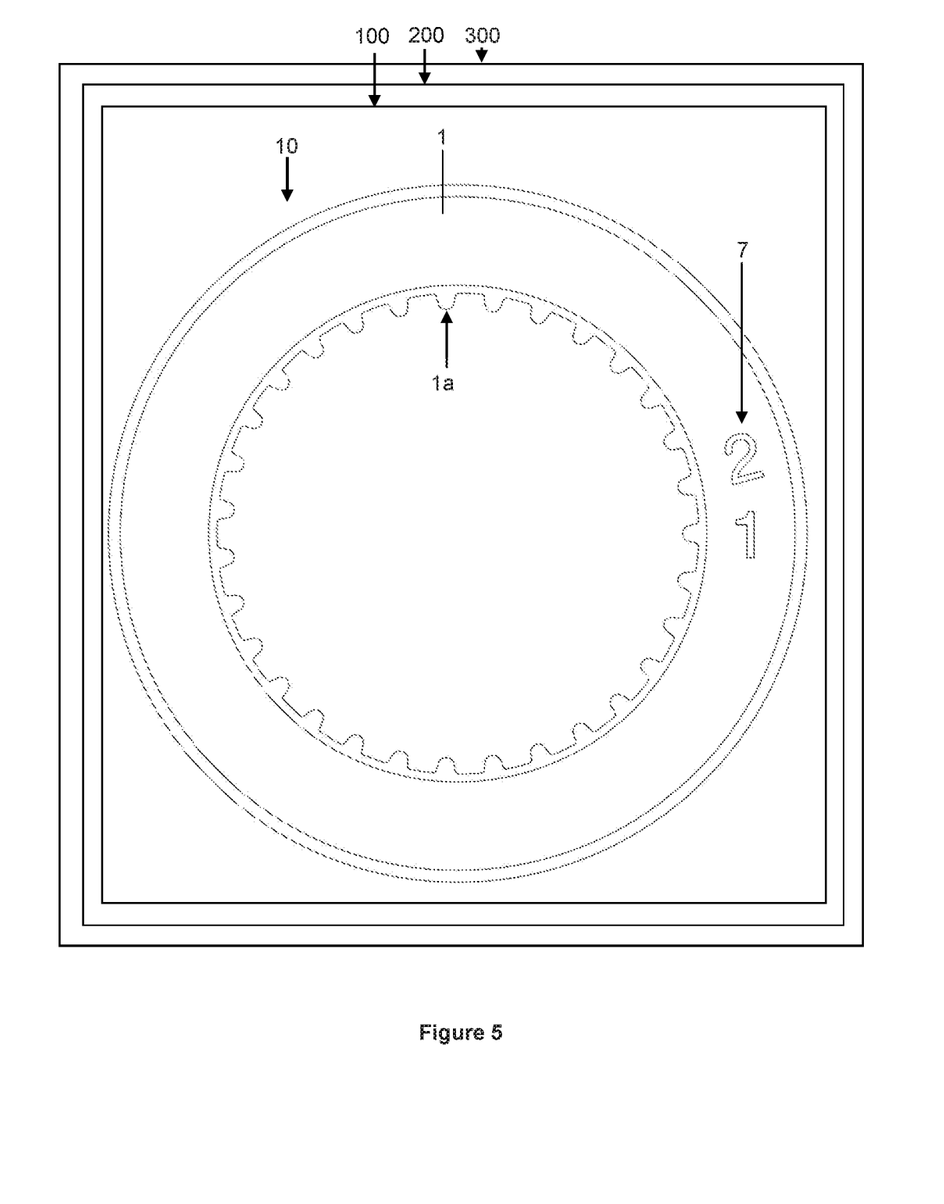
FIG. 5 is a view of a mobile indicating time information or information derived from the time according to a second embodiment.

In a second embodiment of the timepiece 300 represented in FIG. 5, first toothing 1a, constituting a first obstacle element, can be made in one piece with the rest of the mobile, that is to say the ring and the support are integral or made in one piece the one with the other. Thus the mobile can be a disk. It can be made in one piece from titanium or titanium alloy, in particular "grade 2" titanium alloy or "grade 5" titanium alloy. Shapes, in particular openings, can be provided on the mobile so as to enable fine adjustment of the inertia of the mobile for a given geometry of the mobile.

In the embodiments described, the first toothing is an internal toothing. Alternatively, in another embodiment, the first toothing can be an external toothing. In this case, the tips of the teeth of the set of teeth 1a are disposed on the outside diameter d2 of the ring 1. The second toothing can also be internal or external. The third toothing can also be internal or external.

By titanium is preferably meant any material the titanium content of which by mass is greater than 99%, or even greater than 99.5%. By "titanium alloy" is preferably meant any other material in which the majority or dominant element by weight is titanium, such as for example grade 2 titanium or grade 5 titanium (Ti6Al4V). The most satisfactory results relate to the use of grade 5 titanium.

In the first embodiment, the mobile 10 includes a plurality of obstacle elements each forming part of a component of said mobile. In the second embodiment, the mobile is constituted of one and the same component taking the form of a disk, namely, for example, an indicator support made in one piece with a ring. In the second embodiment, the disk supports or constitutes the various obstacle elements.

Whatever the case, an obstacle element comprises at least one element intended to receive a contact action to drive the mobile and/or intended to transmit a contact action to drive another element. An obstacle element can also be intended to receive a contact action for indexing the mobile, for example via an indexing jumper. An obstacle element therefore preferably comprises at least one mobile lever or a tooth or a set of teeth, or a toothing.

The mobile comprises at least one obstacle element made of titanium.

The mobile can in particular comprise two or three obstacle elements made of titanium.

Moreover, whatever the embodiment or the variant, one or more obstacle elements can be attached to the rest of the mobile, in particular a component of the mobile providing a function other than that provided by the obstacle element, in particular on the ring or on the support.

Alternatively or additionally, whatever the embodiment or the variant, one or more obstacle elements can be made in one piece with or integral with the rest of the mobile or with a component of the mobile providing a function other than that provided by the obstacle element, in particular with the ring or with the support.

Whatever the embodiment or the variant, any of the first, second and third obstacle elements can be provided by an internal toothing or by an external toothing or any of the first, second and third obstacle elements can each be provided by an internal toothing or by an external toothing.

In various variants, the mobile may be made in one piece or constituted of an assembly of different components.

It is therefore possible to optimize a calendar mechanism, in particular an annual, semi-perpetual or perpetual calendar mechanism, by proposing a calendar mobile of which at least one portion, in particular at least one set of teeth, in particular at least one set of teeth of a calendar mobile, intended to cooperate by contact with a driving mobile and/or a jumper is made of titanium or of titanium alloy. In fact, a material of this kind has the advantage of having a low mass per unit volume whilst having adequate hardness for the correct operation of the calendar, that is to say an adequate functional surface hardness to receive contact actions, in particular one-off contact actions and/or point contact actions, the intensity of which enables driving of the mobile. A material of this kind is preferably neither coated nor surface hardened. The low mass per unit volume enables the inertia of the mobile to be minimized in order to enable it to be driven whilst limiting the energy the driving mobile is required to supply.

The invention claimed is:

1. A mobile indicating time information or information derived from the time,
   wherein the mobile comprises at least one first obstacle element intended to receive a driving contact action driving the mobile and/or intended to transmit a driving contact action from the mobile,
   wherein the first obstacle element is made of titanium or of titanium alloy,
   wherein the mobile has substantially annular shape,
   wherein the mobile is a calendar mobile, and
   wherein the mobile comprises a ring, on which openings are provided at an outer periphery of the ring so as to enable fine adjustment of the inertia of the mobile for a given geometry of the mobile in order to enable the mobile to be driven whilst limiting the energy the driving mobile is required to supply.

2. The mobile as claimed in claim 1, wherein the first obstacle element comprises or is a first set of teeth.

3. The mobile as claimed in claim 2, wherein the first set of teeth has at least 7 teeth.

4. The mobile as claimed in claim 2, wherein the first set of teeth is designed to cooperate with a first driving finger every hour or every 24 hours.

5. The mobile as claimed in claim 1, wherein the mobile comprises a second obstacle element and wherein the second obstacle element comprises or is a second set of teeth.

6. The mobile as claimed in claim 5, wherein the second set of teeth is fixed relative to the rest of the mobile.

7. The mobile as claimed in claim 5, wherein the second set of teeth comprises one tooth.

8. The mobile as claimed in claim 5, wherein the second set of teeth is designed to cooperate with a second driving finger at the end of at least some months with fewer than 31 days.

9. The mobile as claimed in claim 5, wherein the second set of teeth is movable relative to the rest of the mobile.

10. The mobile as claimed in claim 1, wherein the mobile comprises a third obstacle element and the third obstacle element comprises or is a third set of teeth.

11. The mobile as claimed in claim 1, wherein the mobile comprises a plurality of obstacle elements disposed on a plurality of levels or in a plurality of parallel planes relative to a rotation axis of the mobile.

12. The mobile as claimed in claim 1, wherein the mobile is made in one piece.

13. The mobile as claimed in claim 12, wherein the mobile comprises a support bearing time information or information derived from the time, in particular numeric and/or alphabetic information, the support being integral with a ring.

14. The mobile as claimed in claim 1, wherein the mobile is an assembly of components.

15. The mobile as claimed in claim 14, wherein the mobile comprises a support bearing time information or information derived from the time, the support being attached to a ring or the support being integral with the ring.

16. The mobile as claimed in claim 1, wherein the mobile comprises a guide portion covered with an anti-friction material, or wherein the at least one obstacle element is obtained by laser cutting or by waterjet cutting or each obstacle element is attached to the rest of the mobile or made in one piece with a component of the mobile.

17. A clock system comprising a mobile as claimed in claim 1.

18. The clock system as claimed in claim 17,
   wherein the mobile comprises a first set of teeth and the system comprises a first finger driving the first set of teeth, the first finger being made of steel, and/or
   wherein the mobile comprises a second set of teeth and the system comprises a second finger driving the second set of teeth, the second finger being made of steel.

19. A clock movement comprising a mobile as claimed in claim 1.

20. A timepiece comprising a mobile as claimed in claim 1.

* * * * *